US012644673B2

(12) United States Patent
Melnyk

(10) Patent No.: US 12,644,673 B2
(45) Date of Patent: Jun. 2, 2026

(54) IMAGING SYSTEMS FOR MOVING PLATFORMS

(71) Applicant: Simmonds Precision Products, Inc., Vergennes, VT (US)

(72) Inventor: Zenon Melnyk, Avon, CT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 915 days.

(21) Appl. No.: 17/892,444

(22) Filed: Aug. 22, 2022

(65) Prior Publication Data

US 2024/0337465 A1      Oct. 10, 2024

(51) Int. Cl.
*F41G 7/22* (2006.01)
*G02B 17/08* (2006.01)
*H04N 23/55* (2023.01)

(52) U.S. Cl.
CPC ......... *F41G 7/2253* (2013.01); *F41G 7/2293* (2013.01); *G02B 17/0856* (2013.01); *H04N 23/55* (2023.01)

(58) Field of Classification Search
None
See application file for complete search history.

(56) References Cited

U.S. PATENT DOCUMENTS

| | | | | |
|---|---|---|---|---|
| 4,106,855 A | * | 8/1978 | Coon ................. | G02B 17/0884 250/353 |
| 5,416,319 A | * | 5/1995 | Messina ............... | G01S 7/4817 359/220.1 |
| 5,600,123 A | * | 2/1997 | Purrazzella ........... | G01C 21/16 250/234 |
| 5,860,619 A | * | 1/1999 | Gulitz ................. | F41G 7/2213 244/3.16 |
| 6,116,537 A | | 9/2000 | Kempas | |
| 8,525,088 B1 | | 9/2013 | Ell et al. | |
| 8,575,527 B2 | | 11/2013 | Fry | |
| 9,291,429 B2 | | 3/2016 | Roncone | |
| 9,915,505 B2 | | 3/2018 | Roemerman | |
| 11,789,252 B1 | * | 10/2023 | Hilby ................... | G01M 11/08 359/871 |
| 2003/0098387 A1 | * | 5/2003 | Baumann ............. | F41G 7/2213 244/3.13 |
| 2006/0279647 A1 | * | 12/2006 | Wada ................... | H04N 23/10 348/272 |

* cited by examiner

*Primary Examiner* — Bernarr E Gregory
(74) *Attorney, Agent, or Firm* — Kinney & Lange, P.A.

(57) ABSTRACT

In accordance with at least one aspect of this disclosure, a lens is provided. The lens can be used in an imaging platform of a moving platform (e.g., a projectile or guided munition), for example, in a seeker arrangement. The lens can be configured to optical rotation information of the moving platform to an optical sensor as the moving platform moves in space, for example, following a mission profile.

20 Claims, 6 Drawing Sheets

*Side View*

*Top View*

IMAGING SYSTEMS FOR MOVING PLATFORMS

TECHNICAL FIELD

The present disclosure relates to moving platforms, and more particularly to imaging systems for a moving platform in flight.

BACKGROUND

Traditional guided projectile (e.g., missile) technology, requires GPS availability or high-performance inertial sensors, including gyroscopes and accelerometers, to achieve desired accuracy. However, GPS can be subject to nonintentional and intentional jamming and spoofing and currently available gyroscopes and accelerometers that can meet mission requirements without GPS can be too large for certain guided projectiles and not be able to survive missile flight or gun launch environments.

There remains a need in the art for improvements to guided projectile imaging and positioning technology. This disclosure provides a solution for this need.

SUMMARY

In accordance with at least one aspect of this disclosure, a system includes a lens, an optical sensor configured to receive image data through the lens, one or more mirrors optically connected to the lens to provide inertial information to the optical sensor, and a controller operatively connected to the optical sensor. The controller is configured to determine at least one of direction, pitch, roll, and/or yaw of a moving platform based at least in part on the inertial information received by the optical sensor.

In embodiments, the controller can be configured to control one or more control surfaces of the moving platform to adjust a flight path of the moving platform based at least in part on the inertial information received by the optical sensor compared to a mission profile of the moving platform.

In certain embodiments, the optical sensor can define at least a first pixel area and a second pixel area, where the first pixel area can include seeker pixels configured for tracking a target and the second pixel area can include inertial pixels configured for aiding tracking the target. In embodiments, the second pixel area can be disposed about an outer perimeter of the first pixel area. In embodiments, the one or more mirrors can be configured to project the inertial information to the inertial pixels of the second pixel area only.

In certain embodiments, the second pixel area can include a first pixel array, a second pixel array parallel to the first pixel array, a third pixel array perpendicular to the first and second pixel arrays, and a fourth pixel array parallel to the third pixel array. In such embodiments, the one or more mirrors can be configured to project an upward looking view to the first pixel array, a downward looking view to the second pixel array, and a horizon view to the third and fourth pixel arrays relative to a flight vector of the projectile regardless of the angle of attack of the moving platform.

In embodiments, the controller can be configured to compare a speed of one or more pixels on a first side of the first pixel array and/or the second pixel array to a speed of one or more pixels on a second side of the first pixel array and/or the second pixel array to determine a yaw rate of the platform. In embodiments, the controller can be configured to compare movement of one or more pixels between the first and second side of the first second pixel array and/or the second pixel array to determine a roll rate of the moving platform. In embodiments, the controller can be configured to compare one or more pixels on a first side of the third pixel array and/or fourth pixel array to one or more pixels on a second side of the third pixel array and/or fourth pixel array relative to the horizon to determine a change in pitch of the moving platform and a roll rate of the moving platform.

In certain embodiments, the system can include an optical mask disposed about an outer diameter of the lens and in certain embodiments, the mask can also include an antenna. In embodiments, the system includes the moving platform. In certain embodiments, the moving platform can include a guided munition projectile.

In accordance with at least one aspect of this disclosure, a lens assembly, can include a lens defining a primary optical axis, having an inner surface and an outer surface. One or more reflective surfaces can be optically connected to an outer perimeter of the lens oriented orthogonal to the primary optical axis. The one or more reflective surfaces can be configured to project optical rotation information to an optical sensor while allowing electromagnetic radiation to pass to the lens through an aperture radially inward of the outer perimeter. A mask can be optically connected to one or more of the lens or the one or more reflective surfaces, the mask defining a masked portion and a transparent portion of the lens. In embodiments, the masked portion can substantially align with the one or more reflective surfaces such that electromagnetic radiation originating from the outer surface of the lens passes directly through the transparent portion of the curved substrate to a first portion of the optical sensor only, and electromagnetic radiation originating from the outer perimeter and/or the inner surface of the lens is reflected to a second portion of the optical sensor only. In embodiments, the lens and the one or more reflective surfaces are configured to project linear images onto the optical sensor.

In certain embodiments, all reflective surfaces of the one or more reflective surfaces can be oriented at the same angle relative to the primary optical axis. In certain embodiments, the transparent portion can include two or more sub-portions, each sub-portion having a focal length and/or magnification common among all sub-portions.

In certain embodiments, at least one reflective surface of the one or more reflective surfaces can be oriented at a different angle relative to the primary optical axis than at least one other reflective surface of the one or more reflective surfaces. In certain embodiments, the transparent portion can include two or more sub-portions having different magnifications and/or focal lengths relative to one another.

In embodiments, the lens can be configured for use in an imaging platform of a guided munition. In embodiments, the optical rotation information can include inertial information of the guided munition as the guided munition moves in space.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 9 is a partial schematic diagram of the moving platform detecting a fly by.

DETAILED DESCRIPTION

Figures 1, 2:
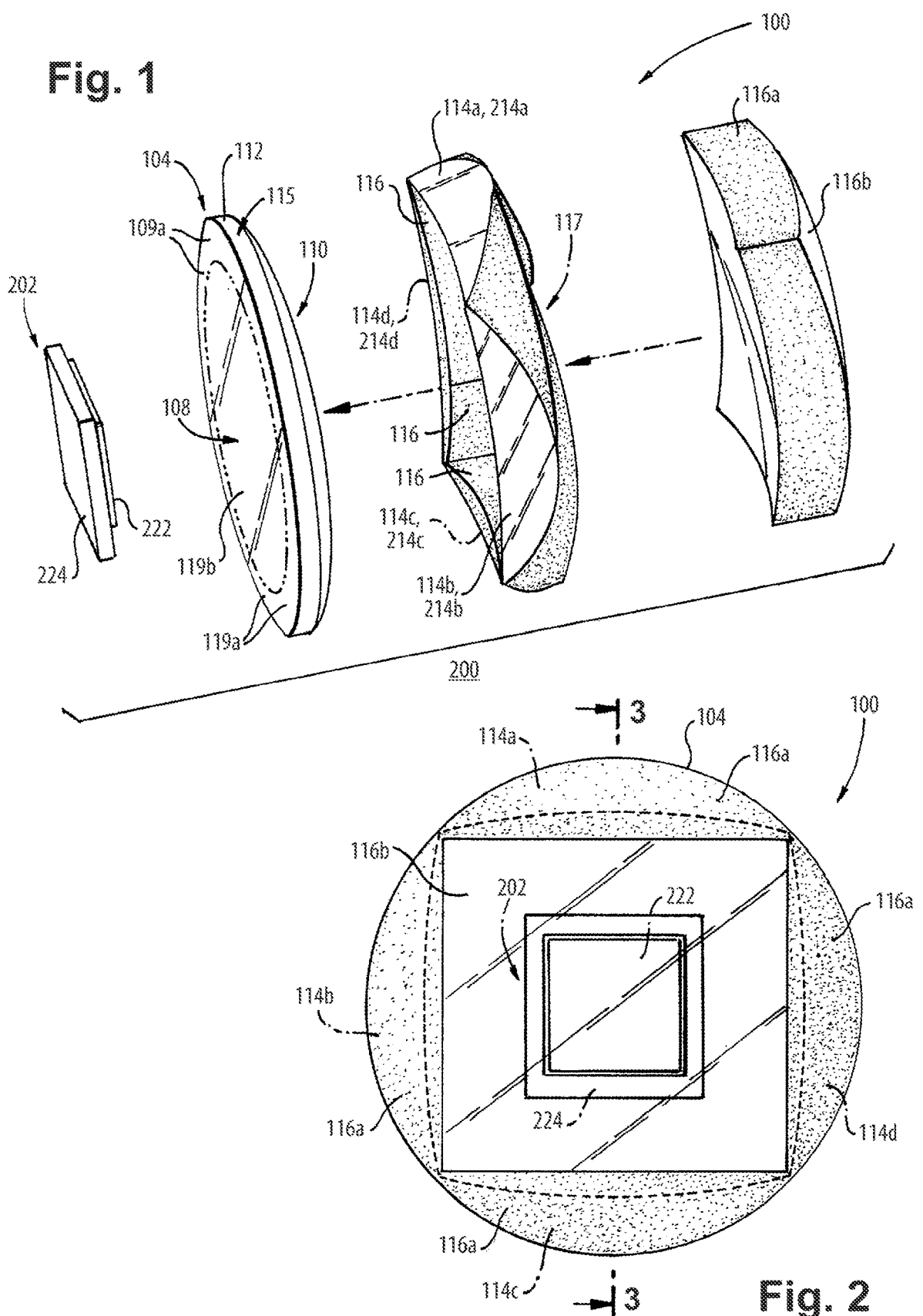
FIG. 1 is an exploded perspective view of system in accordance with this disclosure, showing one or more portions of an imaging platform of the system.
FIG. 2 is a front end view of the imaging platform of FIG. 1.
Figures 3, 4:
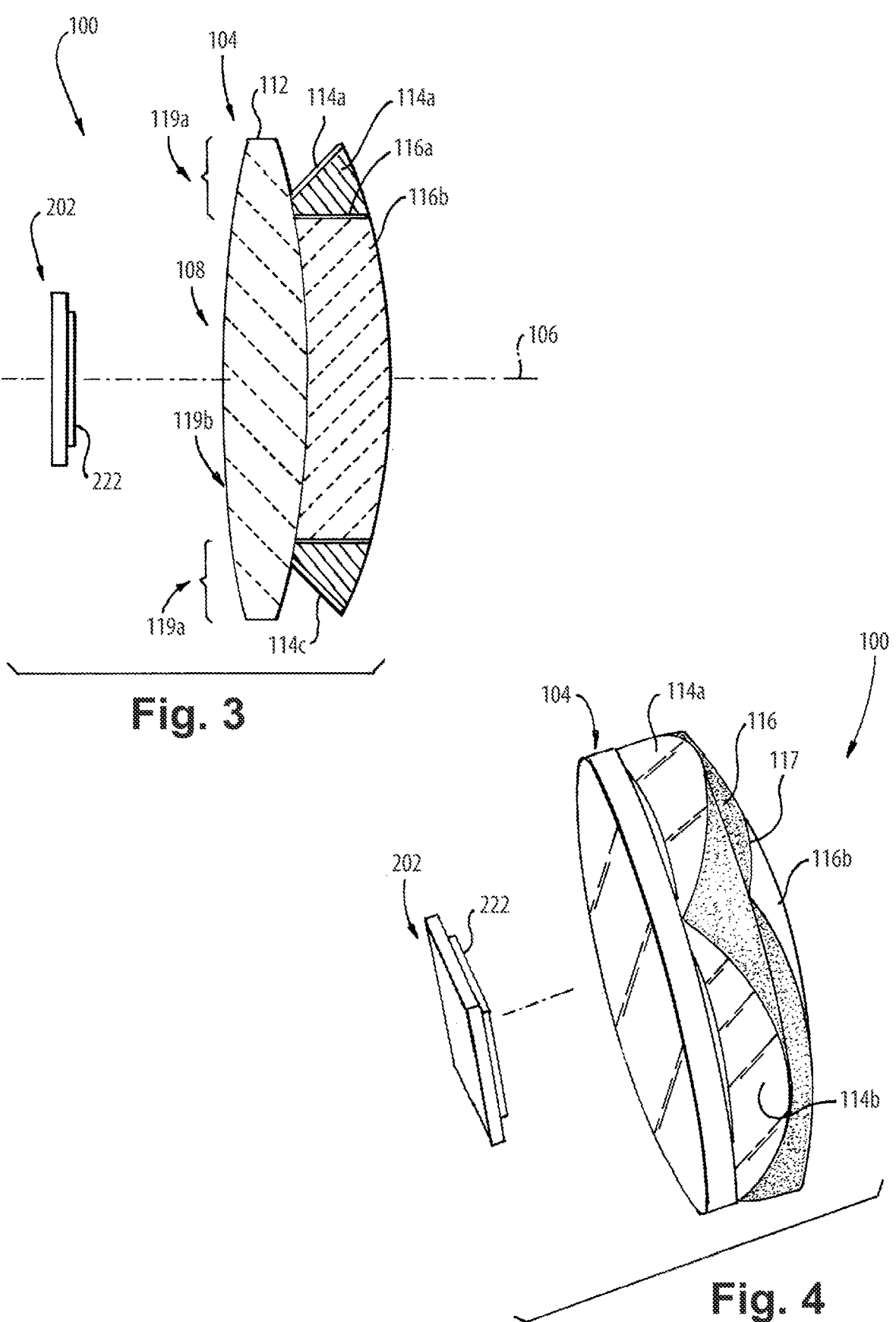
FIG. 3 is a side, cross-sectional view of the imaging platform of FIG. 1.
FIG. 4 is a rear end perspective view of the imaging platform of FIG. 1.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A-9.

In accordance with at least one aspect of this disclosure, and shown in FIGS. 1-5, a lens assembly 100 is provided. The lens assembly 100 can be used in an imaging platform 200 of a moving platform 300 (e.g., a projectile or guided munition), for example in a seeker arrangement 200. The lens assembly 100 can be configured to optical rotation information of the moving platform 300 to an optical sensor 202 as the moving platform 300 moves in space, for example following a mission profile.

In embodiments, as shown in FIG. 1, the lens assembly 100 can include a lens 104 defining a primary optical axis 106 (shown extending into and out of the page in FIG. 2) and having an inner surface 108, an outer surface 110, and an edge 112 connecting therebetween. One or more reflective surfaces 114 can be optically connected to the edge 112 of the lens 104 (e.g., about an outer perimeter 115 of the lens 104). In certain embodiments, the one or more reflective surfaces 114 can include one reflective surface 114a (located in any suitable position), four reflective surfaces 114a,b,c,d (e.g., as shown), or up to ten reflective surfaces, for example. In certain embodiments, the one or more reflective surfaces 114a,b,c,d can be oriented orthogonal to the primary optical axis 106 configured to project the optical rotation information to the optical sensor 202 while allowing electromagnetic radiation (EMR) to pass to the lens 104 through an aperture 117 radially inward of the outer perimeter 115. The optical rotation information can include inertial information.

Figure 5:
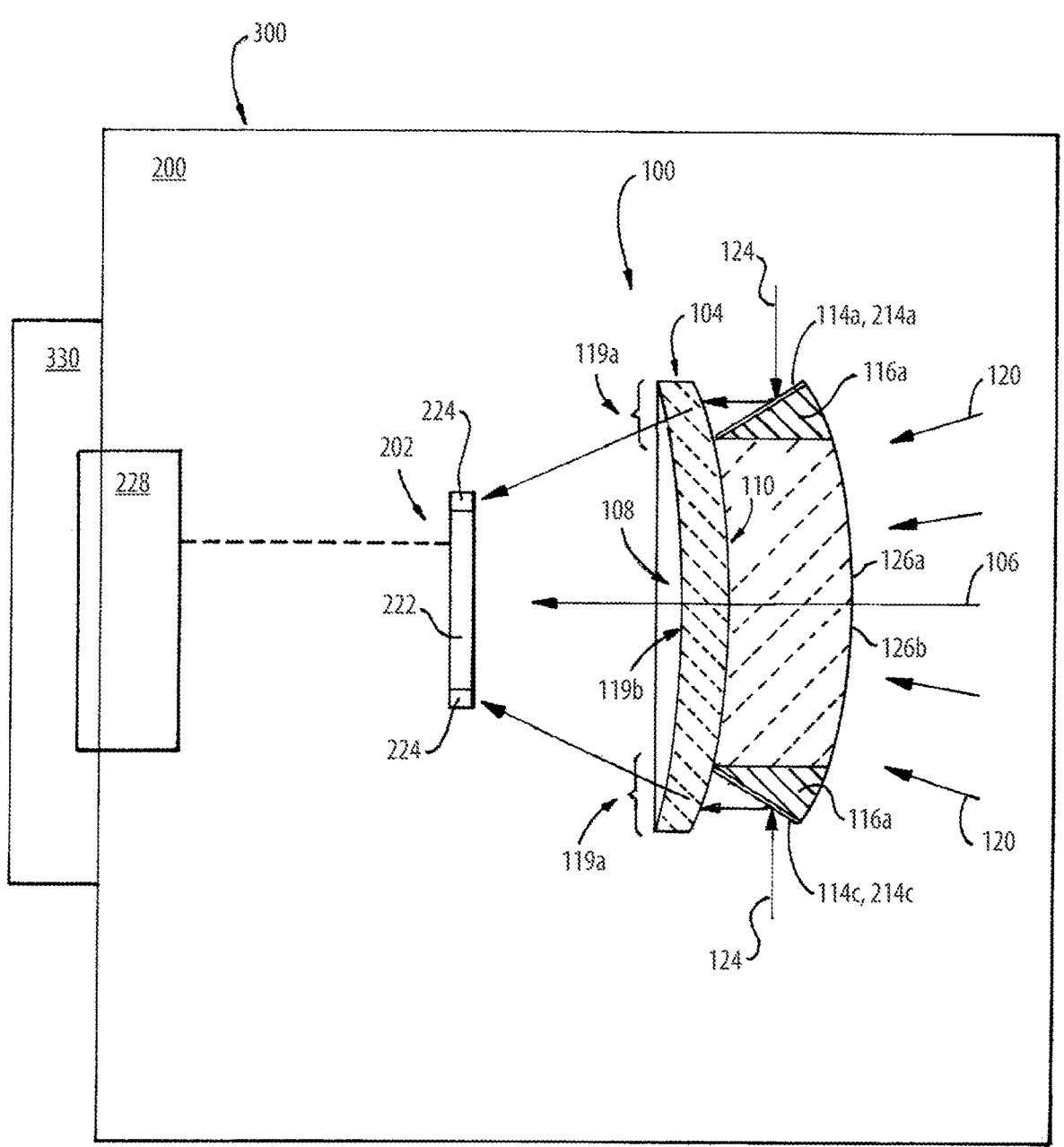
FIG. 5 is a schematic side view of a moving platform having the imaging platform of FIG. 1 included therein.

A mask 116 can be optically connected to one or more of the lens 104 and/or the one or more reflective surfaces 114 (e.g., seated within the aperture 117) to prevent EMR from passing through the lens 104 at the masked portions. In embodiments, the lens 104 can include more than one lens and the mask 116 can be connected to any one or all of the lenses. The mask 116 can define a masked portion 116a and a transparent portion 116b, corresponding to a masked portion 119a of the lens 104 and a transparent portion 119b of the lens 104. In certain embodiments, the masked portion 116a can substantially align with the one or more reflective surfaces 114a,b,c,d. For example, the optical mask 116 can be a reverse side of the reflective surface 114. In certain embodiments, the mask 116 can be disposed along the outer perimeter 115 of the lens surrounding the transparent portion 116b. In such embodiments, EMR 120 originating from the outer side 110 of the lens 104 can pass directly through the transparent portion 116b (e.g., without encountering the optical mask 116 or the reflective surfaces 114) to a first portion 222 of the optical sensor 202 (e.g., a tracking portion of the optical sensor 202), and only the first portion 222 of the optical sensor 202. It should be understood that the masked portion 116a of the lens 104, e.g., as shown in FIGS. 1 and 5 are only masked from light 120 originating from the outer surface (e.g., light 120 coming from the right as shown). Accordingly, EMR 124 originating from the edge 112 and/or the inner side 108 of the lens 104 can be reflected to a second portion 224 of the optical sensor 202 (e.g., the inertial information portion of the optical sensor 202), and only the second portion 224 of the optical sensor 202. The light 124 therefore can pass through the portions 119a of the lens 104 that would be otherwise masked because light 124 originates from behind the mask 116. Having the mask 116 substantially align with the one or more reflective surfaces 114a,b,c,d, or extend slightly beyond the reflective surfaces 114a,b,c,d in a direction radially inward from the outer perimeter 118 prevents tracking image data from bleeding onto the second portion 224 of the optical sensor 202. This will keep the inertial information and the tracking image data separate on the optical sensor 202.

In embodiments, the lens 104 of the lens assembly 100 and the one or more reflective surfaces 114a,b,c,d can be configured to project linear images onto the optical sensor 202 e.g., rather than as a fisheye image or other distorted image.

In certain embodiments, all of the reflective surfaces 114a,b,c,d can be oriented at the same angle relative to the primary optical axis 106. In certain embodiments, the transparent portion 116b can include two or more sub-portions 126a,b and each sub-portion 126a,b can have the same focal length and/or magnification. In certain embodiments, at least one reflective surface of the one or more reflective surfaces 114a,b,c,d can be oriented at a different angle relative to the primary optical axis 106 than at least one other reflective surface. In certain embodiments, the two or more sub-portions 126a,b, can have a different magnification and/or focal length relative to at least one another. Any suitable combination of angles, magnification, and/or focal length is contemplated herein, for example, to account for the total number of reflective surfaces 114, the total number of sub-portions, and/or the mission profile.

In accordance with at least one aspect of this disclosure, a system e.g., the imaging platform 200, can include the lens assembly 100 configured to receive image data through the lens 104, one or more mirrors 214 optically connected to the lens 104 to provide inertial information to the optical sensor 202, and a controller 228. In certain embodiments, the one or more mirrors 214 can be the one or more reflective surfaces 114a,b,c,d of the lens 104 (e.g., a reflective coating on the edge 112 of the lens 104). In certain embodiments, the one or more mirrors 214 can be individual mirrors or a mirror assembly connected to the lens 104, for example as shown in the exploded view of FIG. 1.

As shown in FIG. 5, in embodiments, the controller 228 can be operatively connected to the optical sensor 202 configured to determine at least one of direction, pitch, roll, and/or yaw of the moving platform 300 as the moving platform moves through space based at least in part on the inertial information received by the optical sensor 202. In embodiments, the controller 228 can be configured to control one or more control surfaces 330 of the moving platform (e.g., fins) to adjust a flight path 332 of the moving platform based at least in part on the inertial information received by the optical sensor 202 compared to a mission profile of the moving platform 300 (e.g., as stored in the controller or provided to the controller).

Figure 6:
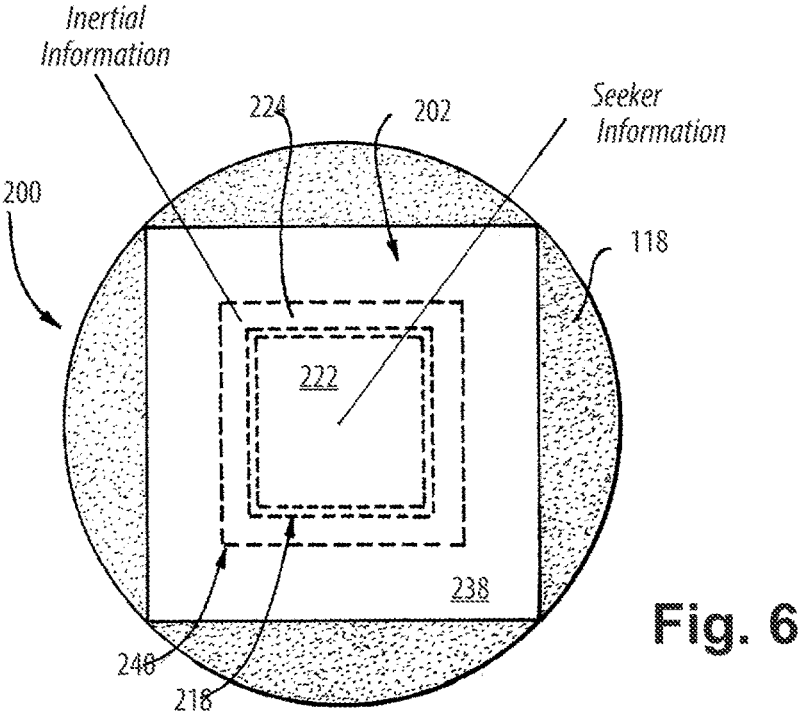
FIG. 6 is a schematic front end view of an optical sensor of the imaging platform of FIG. 1.
Figure 7:
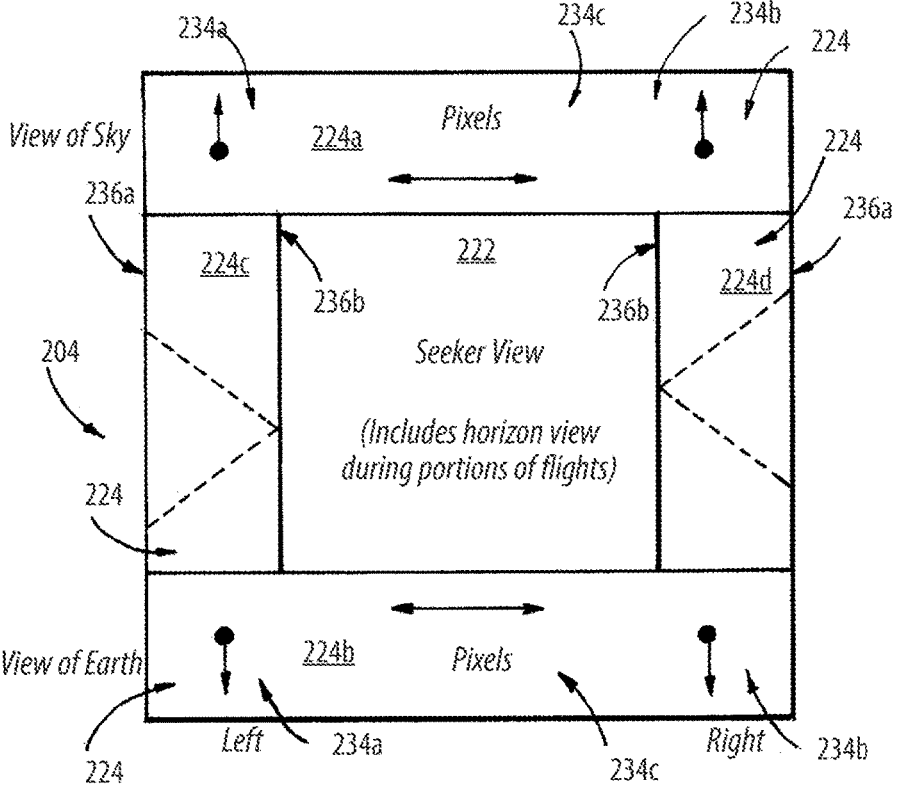
FIG. 7 is an enlarged schematic view of the optical sensor of the imaging platform of FIG. 6, showing pixel movement on the sensor.

Referring now to FIGS. 6-7, the optical sensor 202 can define at least a first pixel area 222 (e.g., the first portion 222 of the optical sensor) and a second pixel area 224 (e.g., the second portion of the optical sensor), as shown. The first pixel 222 area can include seeker pixels configured to receive seeker image data for tracking a target. The second pixel area 224 can include inertial pixels configured to receive optical rotation and inertial image data for aiding the seeker in tracking the target. In embodiments, the optical sensor 202 can include a focal plane array or any other suitable optical sensor. The second pixel area 224 can be disposed about an outer perimeter 218 of the first pixel area 222 (e.g. the inertial pixels can surround the seeker pixels on all four sides of the first pixel area 222). The one or more mirrors 214 can be configured to project the inertial information to the inertial pixels of the second pixel area 224 only. An optical mask (e.g., mask 116) can be disposed about the outer perimeter 118 of the lens 104. In certain embodiments, the mask 116 can be configured to extend onto a portion of the optical sensor 202 (e.g., to mask the second pixel area 224 from one side) to reduce bleed from the first pixel area 222 to the second pixel area 224. In embodiments, the optical mask 116 can include a reverse surface of the one or more mirrors 214 such that the optical mask 116 substantially aligns with the one or more mirrors 214 on opposite sides of the lens 104. The optical mask 116 can be configured so that the seeker image data is projected only onto seeker pixels of the first pixel area 222, and not onto the inertial pixels of the second pixel area 224.

Figure 8A:
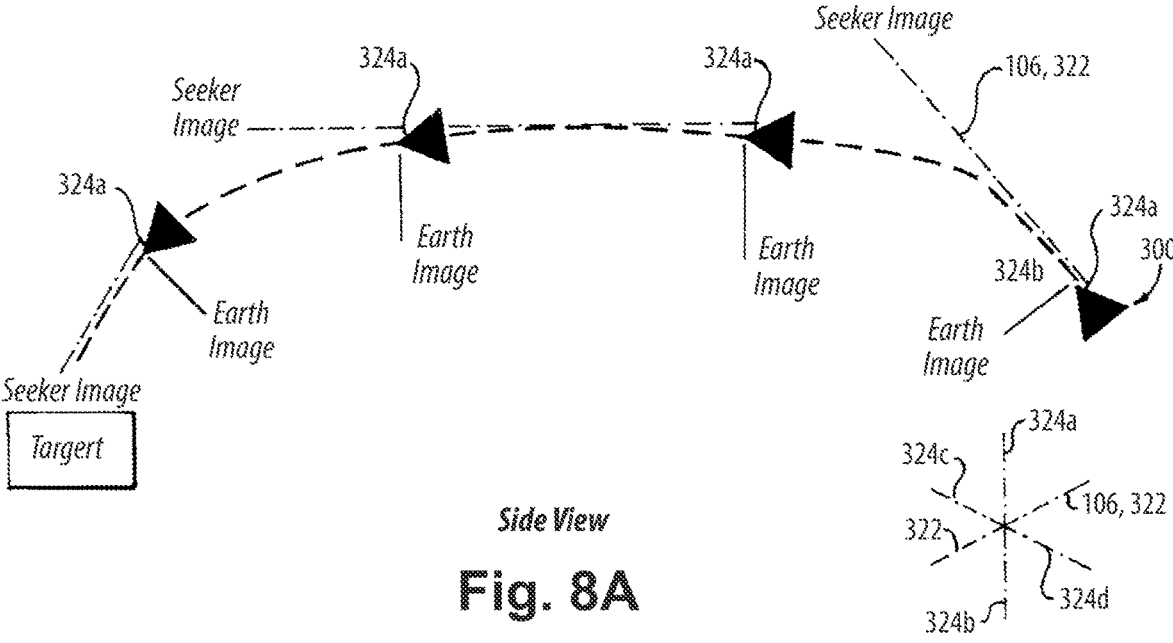
FIG. 8A is a schematic side view of a flight path of the moving platform of FIG. 5 moving through space.
Figure 8B:
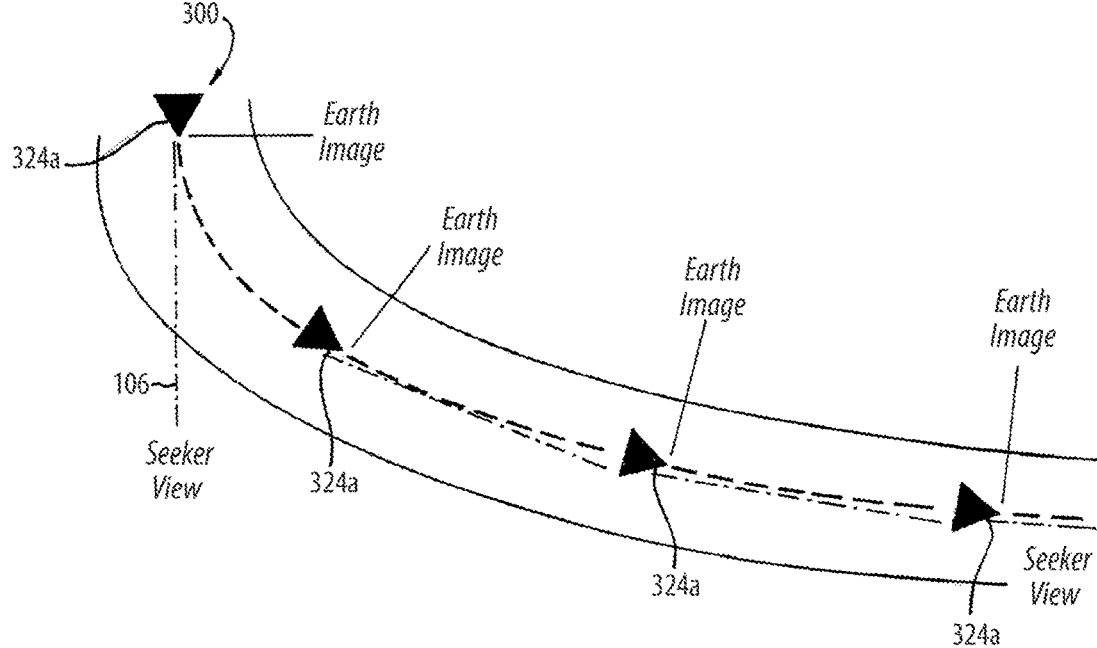
FIG. 8B is a schematic bird's eye view of a flight path of the moving platform of FIG. 5 moving through space.

Referring now to FIGS. 7-8B, in embodiments, the second pixel area 224 can include a first pixel array 224a, a second pixel array 224b parallel to the first pixel array 224a, a third pixel array 224c perpendicular to the first and second pixel arrays 224a,b, and a fourth pixel array 224d parallel to the third pixel array 224c. Assuming, for example, the moving platform is flying along the flight vector 332, as shown in FIG. 8A, a first mirror 214a of the one or more mirrors 214 can be configured to project an upward looking view 324a to the first pixel array 224a (e.g., a sky view), a second mirror 214b can project a downward looking view 324b to the second pixel array 224b (e.g., an earth view), a third mirror 214c and fourth mirror 214d can project a horizon view 324d,c to the third and fourth pixel arrays 224d,c relative to the flight vector 332. The first, second, third, and further mirrors 3214a,b,c,d are configured to project the respective image views regardless of the angle of attack of the moving platform 300. For example, at each stage of flight along the flight vector 332, the first mirror 314a will project a substantially upward looking view, and the second mirror 314b will project a substantially downward looking view. In embodiments, each of the one or more mirrors 214 can be oriented orthogonal relative to the flight vector 332 and optical axis 106, while the seeker view 322 (e.g., through the transparent portion 116b) can be in line with the flight vector 106.

In embodiments, the controller 228 can be configured to compare a speed of one or more pixels on a first side 234a of the first pixel array 224a and/or the second pixel array 224b to a speed of one or more pixels on a second side 234b of the first pixel array and/or the second pixel array to determine a yaw rate of the platform 300. If pixels on the first side 234a of the first pixel array 224a are moving upward or downward relative to the flight vector 332 at a different rate than pixels on the second side 234b of the first pixel array 224a, the controller 228 can determine that the moving platform 30 is experiencing yaw and can calculate a yaw rate. The controller 228 can then control the control surfaces 330 of the moving platform 300 to steer the moving platform 300 to account for the yaw information. The same can be true for the second pixel array 224b.

In embodiments, the controller 228 can be configured to compare the movement of one or more pixels in an area 234c between the first and second side 234a,b of the first second pixel array 224a and/or the second pixel array 224b to determine a roll rate of the moving platform 30. For example, if pixels in a central region 324c of the first pixel array 224a (e.g., between the first and second sides 234a,b) are observed moving left or right relative to the flight vector 332, the controller 228 can determine that the moving platform 300 is experiencing a roll and can calculate a roll rate. The controller 228 can then control the control surfaces 330 of the moving platform 300 to counteract the roll. The same can be true for the second pixel array 224b.

In embodiments, the controller 228 can be configured to compare one or more pixels on a first side 236a of the third pixel array 224c and/or fourth pixel array 224d to one or more pixels on a second side 236b of the third pixel array 224c and/or fourth pixel array 224d relative to the horizon to determine a change in pitch of the moving platform 300 and a roll rate of the moving platform 300. For example, if pixels on the first side 236a of the third pixel array 224c and pixels on the second side 236b of the third pixel array 224c show a separation in the horizon view and/or a change in angle of the pixel relative to the horizon, the controller 228 can determine that the moving platform is experiencing a change in pitch. If the horizon view of the third pixel array 224c moves in one direction and the horizon view of the fourth pixel array 224d moves in the opposite direction, the controller 228 can determine that the moving platform 300 is experiencing a roll. In both cases, the controller 228 can calculate the change in pitch and the roll rate and control the control surfaces 330 of the moving platform 300 to account for or counteract the change in pitch and roll.

In certain embodiments, the optical sensor 202 can include one or more additional pixel areas 238 disposed about an outer perimeter 240 of the second pixel area 224, and configurable for any other suitable purpose, for example, for receiving polarized light if polarizers are included in the lens assembly 100 to aid in detecting direction. In certain embodiments adding polarization filters on some portion of each axis of incoming light would allow the optical sensor 202 to compare the intensity of the polarized light signal from the unpolarized light signal. Rotating the moving platform 300 while in flight and comparing the polarized light intensity to the unpolarized light intensity would allow the moving platform 300 to determine the angle of polarization and degree of polarization, creating a polarization representation of the surroundings. Knowing the starting point and time of day, the moving platform would calculate an angle of polarization and degree of polarization for the intended flight azimuth. After launch, the moving platform 300 can then compare the calculated angle of polarization and degree of polarization with the in-flight measured values and make the needed azimuth corrections required to reach the target location.

In certain embodiments, the optical mask 116 can further include or can be configured to act as an antenna for the moving platform 300. In embodiments, the system includes the moving platform 300, and in certain embodiments, the moving platform 300 can include a guided munition and/or projectile such as a missile.

Embodiments includes a lens and optical arrangement for a projectile or missile seeker that includes an integrated inflight view of ground features (including horizon) and sky features (stars, moon & sun) to provide corrections and navigation attitude/position 'fixes' without having to alter the flight body's angle of attack/slip. The integrated inflight view can be provided to the optical sensor via one or more mirrored or reflective surfaces on the lens, and without additional internal sensor or additional optical devices outside of the lens.

Typical projectiles having seekers may requires GPS availability or high-performance inertial sensors, including gyroscopes and accelerometers, to achieve desired accuracy. However, Global Positioning Satellite (GPS) signals can be subject to nonintentional and intentional jamming and spoofing. Further, existing gyroscopes and accelerometers that are able to provide the required performance to meet mission requirements without GPS are too large and may not survive in a missile during launch.

Embodiments include a lens that comprises built-in mirrors to gather light that is orthogonal to the primary axis. These built-in mirrors can provide optical rotation information in the pitch, roll and yaw axis on a single focal plane array or single optical sensor. The image projected onto the focal plane array or optical sensor includes the primary seeker axis in the center along with a frame of an orthogonal view (e.g., up, down, left and right relative to the primary axis). Certain embodiments can include a mirror configuration having four mirrors, but certain embodiments could be implemented with 1 to 10 or more mirrors. In embodiments, the projectile or missile could be flown in different orientations, selecting mirrors that have different zoom or wide-angle effects looking at the ground below, both horizons to the side, or the sky above, as required. This can allow the mirrors on the lens to provide optical rotation information on three axes, as shown in FIG. 6A. In embodiments, the controller 228 can include one or more inertial sensors, such as a gyroscope or accelerometer, and the optical rotation information from the lens can aid the gyroscopes, allowing lower cost sensors to be used and to perform more accurately.

In embodiments, the center of the focal plane array can include the seeker view and the outside can have the side, top, and bottom views for inertial aiding. The mask on the front of the lens can be used as an antenna in certain embodiments. The actual focal plane array can also be masked to reduce image bleed over from the seeker view to the inertial side views.

In such embodiments, the center portion of the focal plane array can provide seeker information. The top portion will have a sky view and the bottom portion will have an earth view, as shown in FIGS. 5-6B. If the pixels on the portside, or left of the focal plane array of the earth view, move at different rate than the pixels of the starboard, or right side, the projectile is experiencing a yaw motion. The same process can be followed with the sky view. If the pixels in the earth view or sky view are moving left or right, it means that the projectile is experiencing a roll rate. The side portions of the focal plane array will provide horizon information, as shown in FIGS. 5-6B. If the projectile is flying level, the image will be flat. If the projectile is pitching up or down, the horizon line will no longer be level and will be detected as a change in pitch. If the horizon image on the left moves up or down and the image on the right moves in the opposite direction, it means that the projectile or missile is experiencing a roll rate.

Figure 9:
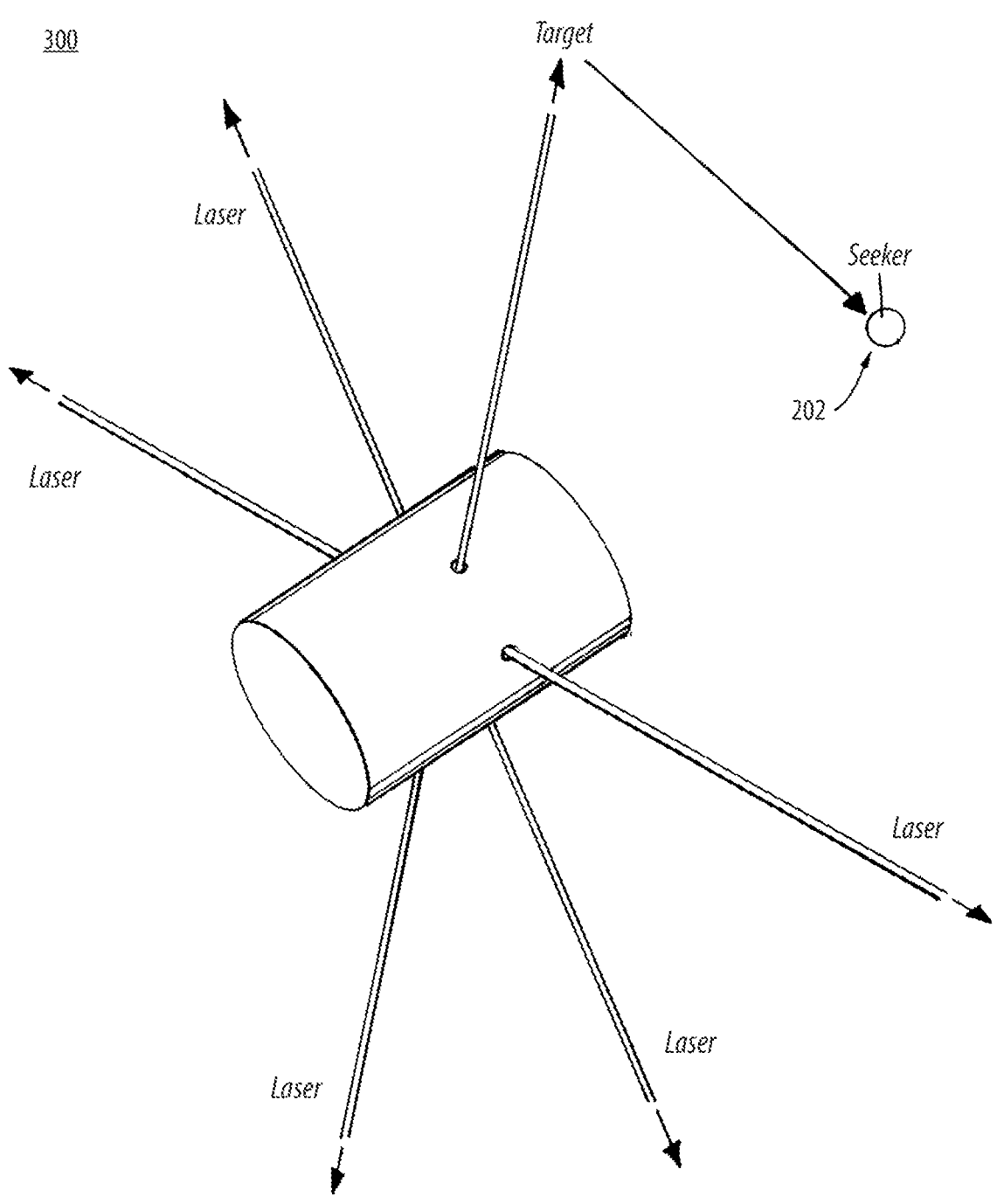

As shown, the earth image can be taken at an orthogonal angle from the projectile or a missile center line or the flight vector. In certain embodiments, if the detailed maps are available (e.g., via the controller), the earth image would change over time with yaw inputs on the projectile or missile, as shown in FIG. 6B. Such embodiments may utilize scene matching to significantly improve the accuracy of tracking and guidance, though scene matching is not required for all embodiments. By changing the flight path during flight, it can make counter battery radar struggle to determine the origin of the firing position. In embodiments, the projectile or missile can directly detect fly by or flying near the target for fuse and warhead detonation. Active laser proximity fuses emit multiple beams of laser light orthogonal to the flight path of the projectile or missile, as shown in FIG. 9, for example. As the projectile or missile passes the target, some of the lased energy strikes the target and is reflected to the seeker/detector. In embodiments, the seeker focal plane array can therefore also be used to detect laser proximity fuse reflections from a target during a fly-by to trigger one or more responses by the moving platform. Here, the seeker included in the optical sensor 202 and the lens assembly 100 are able to capture the reflected laser light while detecting a fly by without requiring additional laser or optical sensors dedicated for fly by purposes.

Embodiments allow the seeker portion of the optical sensor to retain full seeker capability. Embodiments can enhance day and night flight performance in all scenarios, including in GPS degraded environments, further allowing an existing seeker to also provide inertial enhancements to improve midcourse corrections. Embodiments can provide accurate wayfinding without using GPS, and the claimed system cannot be jammed like GPS. Embodiments maintain image linearity vs "fisheye" image nonlinearity.

In embodiments, image information can be used to calibrate inertial instruments and update the flight path as needed. Embodiments can enable smaller, lower performing and environmentally robust inertial sensors to meet mission requirements. Embodiments include lower cost and complexity optical sensors using a single lens and sensor, for example, rather than including multiple separate focal plane arrays or an optical sensor and additional associated lenses and optical structures.

In embodiments, the lens assembly can be optimized for environmental shock, such as launch shock, a setback shock or a cross balloting shocks. Because embodiments include only a single optical sensor instead of multiple, the lens assembly design can be optimized for one set of environmental axes rather than multiple axes that require different optimization for each sensor.

Embodiments can be ideal for missile and projectile seeker applications with tight volume and small seeker window area availability. Typically, a seeker is in an ideal location to have an unobstructed view in front of and around the projectile to gather three axes of rotation information. In embodiments, placing the inertial sensors near the single focal plane array or optical sensor can provide significant common mode error cancelation because all inertial images go through a common lens and structure. This can be important when trying to detect small changes in pixel movement. Embodiments can include a single focal plane array or optical sensor which can assure that all inertial image information is fully synchronized without variable propagation delays, reducing errors.

Embodiments can enable additional capability by utilizing existing hardware within an existing imaging platform with minimal mechanical enhancement and some upgraded software. In certain embodiments, the claimed lens and/or system can replace a laser detector portion of fuse system used to trigger a warhead when missile or projectile flies past aircraft by detecting reflected energy from multiple lasers pointing out from the missile to trigger fuse and detonate the warhead. In certain embodiments, orthogonal missile or projectile views can be used to directly detect missile or projectile fly by to trigger fuse and detonate the warhead In certain embodiments, preflight mission planning software can upgrade overall performance of the munition and system described herein by using available star maps, photos, or maps considering current and predicted weather over the flight path, optimize the predicted flight altitude, and estimate available details based on available resolutions. In certain embodiments, mission planning software can estimate map shift errors using map fusion based on known locations and coordinates and estimate the shadow lines at the time of flight. In addition, in embodiments, mission planning software can identify discernable waypoints, predict CEP based on desired mission time of day, and optimize flight path for the most discernable waypoints and to reduce the effectiveness of counter battery radar as a counter measure.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," "controller," or "system." A "circuit," "module," "controller," or "system" can include one or more portions of one or more separate physical hardware and/or software components that can together perform the disclosed function of the "circuit," "module," "controller," or "system", or a "circuit," "module," "controller," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. A computer readable signal medium may be any computer readable medium that is not a computer readable storage medium and that can communicate, propagate, or transport a program for use by or in connection with an instruction execution system, apparatus, or device.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:

a lens;

an optical sensor configured to receive image data through the lens;

one or more mirrors optically connected to the lens to reflect inertial information to the optical sensor; and a controller operatively connected to the optical sensor, the controller configured to determine at least one of direction, pitch, roll, and/or yaw of a moving platform based at least in part on the inertial information received by the optical sensor;

wherein the optical sensor defines at least a first pixel area and a second pixel area, wherein the first pixel area includes seeker pixels configured for tracking a target and the second pixel area includes inertial pixels configured for aiding tracking the target.

2. The system of claim 1, wherein the controller is configured to control one or more control surfaces of the moving platform to adjust a flight path of the moving platform based at least in part on the inertial information received by the optical sensor to account for the at least one of direction, pitch, roll, and/or yaw of the moving platform.

3. The system of claim 1, wherein the second pixel area is disposed about an outer perimeter of the first pixel area.

4. The system of claim 1, wherein the one or more mirrors are configured to reflect the inertial information to the inertial pixels of the second pixel area only.

5. The system of claim 4, wherein the second pixel area includes a first pixel array, a second pixel array parallel to the first pixel array, a third pixel array perpendicular to the first and second pixel arrays, and a fourth pixel array parallel to the third pixel array.

6. The system of claim 5, wherein the one or more mirrors are configured to reflect an upward looking view to the first pixel array, a downward looking view to the second pixel array, and a horizon view to the third and fourth pixel arrays relative to a flight vector of the projectile regardless of an angle of attack of the moving platform.

7. The system of claim 6, wherein the controller is configured to compare a speed of one or more pixels on a first side of the first pixel array and/or the second pixel array to a speed of one or more pixels on a second side of the first pixel array and/or the second pixel array to determine a yaw rate of the platform.

8. The system of claim 7, wherein the controller is configured to compare movement of one or more pixels between the first and second side of the first second pixel array and/or the second pixel array to determine a roll rate of the moving platform.

9. The system of claim 8, wherein the controller is configured to compare one or more pixels on a first side of the third pixel array and/or fourth pixel array to one or more pixels on a second side of the third pixel array and/or fourth pixel array relative to the horizon to determine a change in pitch of the moving platform and a roll rate of the moving platform.

10. The system of claim 1, further comprising an optical mask disposed about an outer diameter of the lens.

11. The system of claim 10, wherein the mask further includes an antenna.

12. A moving platform comprising the system of claim 1.

13. The moving platform of claim 12, further comprising a guided munition projectile.

14. A lens assembly, comprising:

a lens defining a primary optical axis, having an inner surface and an outer surface;

one or more reflective surfaces optically connected to an outer perimeter of the lens oriented orthogonal to the primary optical axis, configured to reflect optical rotation information to an optical sensor while allowing electromagnetic radiation to pass to the lens through an aperture radially inward of the outer perimeter; and a mask optically connected to one or more of the lens or the one or more reflective surfaces, the mask defining a masked portion and a transparent portion of the lens, wherein the masked portion substantially aligns with the one or more reflective surfaces such that electromagnetic radiation originating from the outer surface of the lens passes directly through the transparent portion of the lens to a first portion of the optical sensor only, and electromagnetic radiation originating from the outer perimeter and/or the inner surface of the lens is reflected to a second portion of the optical sensor only.

15. The lens of claim 14, wherein the lens and the one or more reflective surfaces are configured to reflect linear images onto the optical sensor.

16. The lens of claim 14, wherein all reflective surfaces of the one or more reflective surfaces are oriented at the same angle relative to the primary optical axis, and wherein the transparent portion includes two or more sub-portions, each sub-portion having a focal length and/or magnification common among all sub-portions.

17. The lens of claim 14, wherein at least one reflective surface of the one or more reflective surfaces is oriented at a different angle relative to the primary optical axis than at least one other reflective surface of the one or more reflective surfaces, and wherein the transparent portion includes two or more sub-portions having different magnifications and/or focal lengths relative to one another.

18. The lens of claim 14, wherein the lens is configured for use in an imaging platform of a guided munition.

19. The lens of claim 18, wherein the optical rotation information includes inertial information of the guided munition as the guided munition moves in space.

20. A system, comprising:

a lens;

an optical sensor configured to receive image data through the lens;

one or more mirrors optically connected to the lens to reflect inertial information to the optical sensor; and a controller operatively connected to the optical sensor, the controller configured to determine at least one of direction, pitch, roll, and/or yaw of a moving platform based at least in part on the inertial information received by the optical sensor;

wherein the controller is configured to control one or more control surfaces of the moving platform to adjust a flight path of the moving platform based at least in part on the inertial information received by the optical sensor to account for the at least one of direction, pitch, roll, and/or yaw of the moving platform.

* * * * *